United States Patent [19]

Kitagawa et al.

[11] Patent Number: 5,312,131
[45] Date of Patent: May 17, 1994

[54] AIR BAG DEVICE FOR A KNEE OF AN OCCUPANT

[75] Inventors: Motonobu Kitagawa; Akira Kokeguchi; Misao Kamiyama; Tadayuki Atoh, all of Shiga, Japan

[73] Assignee: Takata Corporation, Tokyo, Japan

[21] Appl. No.: 4,267

[22] Filed: Jan. 14, 1993

[30] Foreign Application Priority Data

Feb. 5, 1992 [JP] Japan .................. 4-020047

[51] Int. Cl.$^5$ ............................................. B60R 21/22
[52] U.S. Cl. ..................... 280/730 A; 280/728 R; 280/730 R; 280/753
[58] Field of Search ............... 280/752, 753, 730, 732, 280/728 R, 751, 730 A

[56] References Cited

U.S. PATENT DOCUMENTS

| | | | |
|---|---|---|---|
| 3,702,706 | 11/1972 | Sobkow | 280/730 R |
| 3,927,901 | 12/1975 | Weman | 280/730 R |
| 3,981,518 | 9/1976 | Pulling | 280/730 A |
| 5,161,820 | 11/1992 | Vollmer | 280/732 |
| 5,172,790 | 12/1992 | Ishikawa et al. | 280/730 A |

FOREIGN PATENT DOCUMENTS

| | | | |
|---|---|---|---|
| 1431098 | 1/1966 | France | 280/730 R |
| 47-24110 | 7/1972 | Japan . | |
| 3-28050 | 2/1991 | Japan . | |

*Primary Examiner*—Eric Culbreth
*Attorney, Agent, or Firm*—Kanesaka & Takeuchi

[57] ABSTRACT

An air bag device for a knee of an occupant, includes an air bag to be extended in front of a seat of a vehicle and in a zone at a height of the seat. The air bag device is arranged at a widthwise center portion of the vehicle. The air bag includes a first air bag to be extended in a zone in front of the righthand seat of the vehicle, and a second air bag to be extended in a zone in front of the lefthand seat of the vehicle.

3 Claims, 4 Drawing Sheets

AIR BAG DEVICE FOR A KNEE OF AN OCCUPANT

BACKGROUND OF THE INVENTION

1. Field of the Invention

The present invention relates to a device for protecting an occupant of a vehicle and, more particularly, to an air bag device for a knee of an occupant as called a "knee bag device".

2. Description of the Related Art

An occupant protecting device having an air bag (or a knee bag) to be extended in front of a knee of the occupant of a vehicle is disclosed in Japanese Utility Model Publication No. 24110/1972 and Japanese Patent Laid-Open No. 28050/1991. This knee bag can be extended to protect the lower half of the occupant by preventing the submarine motion of the occupant (i.e., the motion of the occupant's body into a spare adjacent the front lower portion of the seat).

The occupant protecting devices, as known in the above-specified individual publications, have their air bag device arranged in front of the center of the seat. As a result, the air bag device is positioned near the knees of the occupant to raise a problem of deteriorating the comfortableness of the vehicle cabin.

In order to protect the occupants on both driver's and passenger's seats, two air bag devices have to be disposed at both the driver's and passenger's seats in accordance with the prior art so that component cost is raised and that the mounting of the air bag devices consumes long time.

OBJECT AND SUMMARY OF THE INVENTION

According to a first aspect of the present invention, there is provided an air bag device for a knee of an occupant, comprising an air bag adapted to be extended in front of a seat of a vehicle including a zone at a height of the seat, wherein the air bag device is arranged at a widthwise center portion of the vehicle, and wherein the air bag device includes a first air bag adapted to be extended in a zone in front of the righthand seat of the vehicle and a second air bag adapted to be extended in a zone in front of the lefthand seat of the vehicle.

According to a second aspect of the present invention, the air bag device of the first aspect is disposed in the console box of the vehicle.

According to a third aspect of the present invention, the air bag device of the first aspect further comprises one gas generator for extending both the first and second air bags.

According to a fourth aspect of the present invention, the air bag device of the second aspect further comprises a retainer arranged at the center of the console box, a first air bag arranged at the side of the righthand seat, a second air bag arranged at the side of the lefthand seat, one gas generator mounted on the retainer for injecting gases into both the first and second air bags, a first module cover attached to the retainer and covering the first air bag, and a second module cover attached to the retainer and covering the second air bag, wherein the first and second module covers facing the openings which are formed in both the righthand and lefthand sides of the console box.

According to a fifth aspect of the present invention, in the air bag device of the first aspect, the first and second air bags individually have gas generators and detection means for detecting whether or not an occupant is on the seat so that the air bag at the side, in which the occupant is on the seat may be exclusively extended.

According to the air bag device of the present invention, both the occupants on the driver's and passenger's seats can be protected by arranging one air bag device.

The air bag device of the second aspect is disposed in the console box so that it can provide a wide space around the knees of the occupant.

The air bag device of the third and fourth aspects has its two air bags extended by the one gas generator so that the cost for its parts is low.

In the air bag device of the fifth aspect, only the air bag at the occupied side can be held in an operable state.

DESCRIPTION OF THE PREFERRED EMBODIMENTS

The present invention will be described in the following in connection with embodiments thereof with reference to the accompanying drawings.

Figure 1:
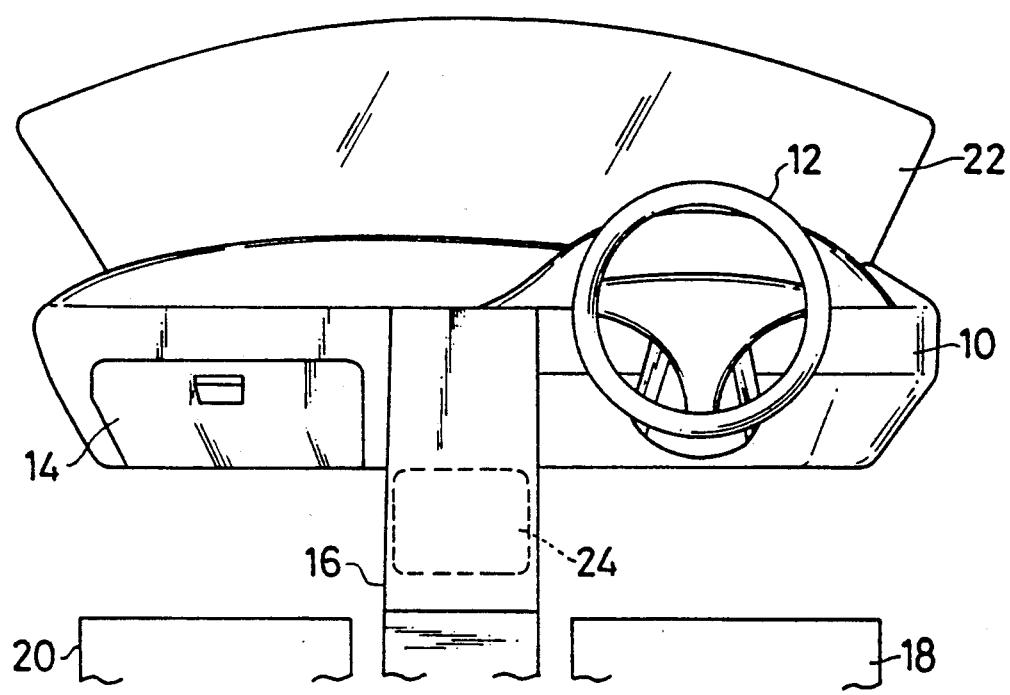
FIG. 1 is a perspective view taken from the back and showing the inside of a vehicle cabin which is equipped with an air bag device according to an embodiment of the present invention.
Figure 2:
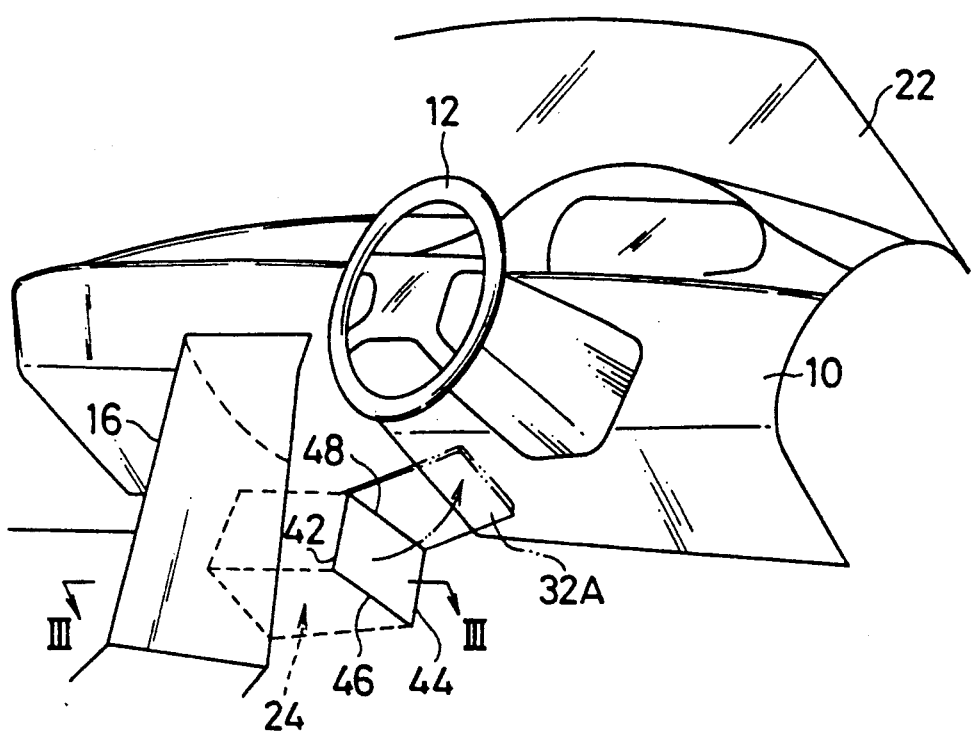
FIG. 2 is a perspective view similar to FIG. 1 but taken from a driver's seat.

In FIGS. 1 and 2, an instrument panel 10, a steering wheel 12, a glove box 14, a console box 16, a driver's seat 18 and a passenger's seat 20 are provided in a cabin of a vehicle. Numeral 22 designates a front shield.

Figure 3:
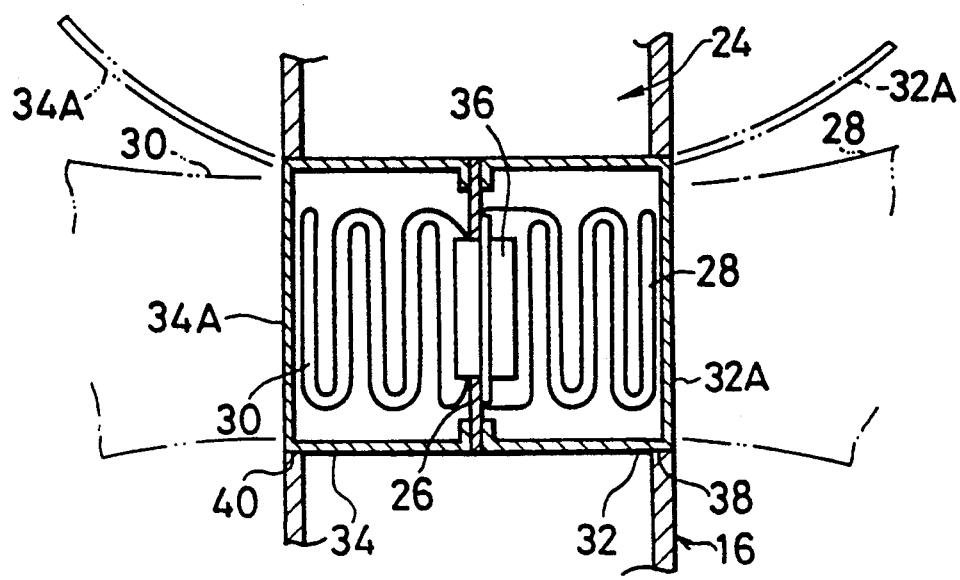
FIG. 3 is a section taken along line III—III of FIG. 2.

In the console box 16, there is disposed an air bag device 24. As shown in FIG. 3, the air bag device 24 comprises a retainer (or a mounting plate) 26 arranged at the center of the console box 16 to have its face directed vertically and longitudinally of a vehicle body, a first air bag 28 mounted on the retainer 26 at the side of the driver's seat 18, a second air bag 30 mounted on the retainer 26 at the side of the passenger's seat 20, a first module cover 32 having its base end fixed on the retainer 26 and covering the first air bag 28; and a second module cover 34 having its base end fixed on the retainer 26 and covering the second air bag 30. The air bag device 24 further comprises an inflater 36 which is mounted on the retainer 26 for extending both the first air bag 28 and the second air bag 30.

The console box 16 is formed at both the sides of the driver's seat 18 and the passenger's seat 20 with openings 38 and 40. The air bag device 24 is so arranged that the module covers 32 and 34 have their surfaces flush with the peripheral portions of those openings 38 and 40.

As shown in FIG. 2, the module covers 32 and 34 are formed with tear starting lines called "tear lines", along their upper sides 42, lower sides 44 and rear sides 46. On the other hand, the front sides 48 of the openings are formed with none of such tear lines so that the module covers 32 and 34 may have their surface sides 32A and 34A opened around the front sides 48 like doors when they are torn.

Figure 4:
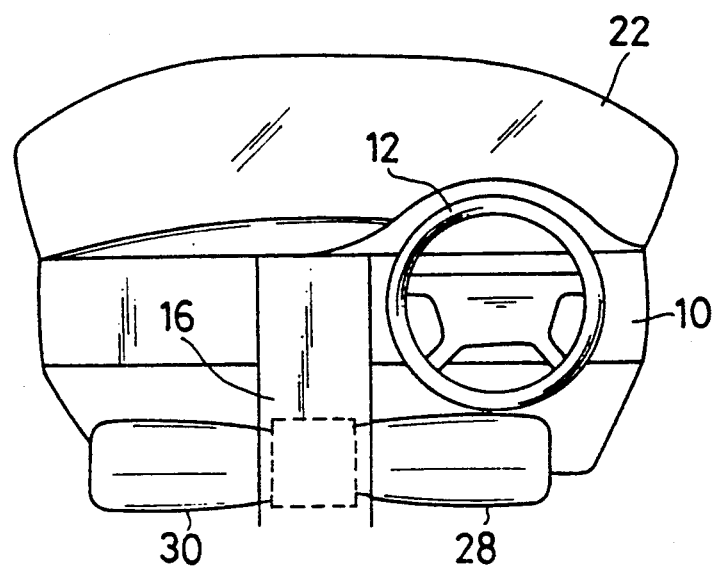
FIG. 4 is a perspective view showing the operating state of the air bag device according to the embodiment.

When the automobile collides, the air bag device thus constructed has its inflater 36 energized in response to a signal coming from an acceleration sensor (not shown), so that the air bags 28 and 30 are extended. Then, the module covers 32 and 34 are pushed by the air bags 28 and 30 being extended, so that their surface sides 32A and 34A are opened like doors, as indicated by double-dotted lines in FIGS. 2 and 3. Thus, the air bags 28 and 30 are extended to the zones in front of and at a height of the seats 18 and 20, as shown in FIG. 4, to protect legs including knees of the occupants.

According to the air bag device of the present embodiment, both the occupants at the driver's seat 18 and the passenger's seat 20 can be protected by providing only one air bag device 24. As a result, the cost for the device can be reduced together with the number of steps of mounting the air bag device.

Since the air bag device 24 has its two air bags 28 and 30 extended by the single inflater 36, it reduces prime cost thereof and it makes electric wiring for operating the inflater 36 easy.

Moreover, since the air bag device 24 is arranged in the console box 16, as shown in FIGS. 1 and 2, there is wide space around the knees of the occupants on the driver's seat 18 and the passenger's seat 20 thereby to provide an excellent comfortableness in the vehicle cabin.

Figure 5:
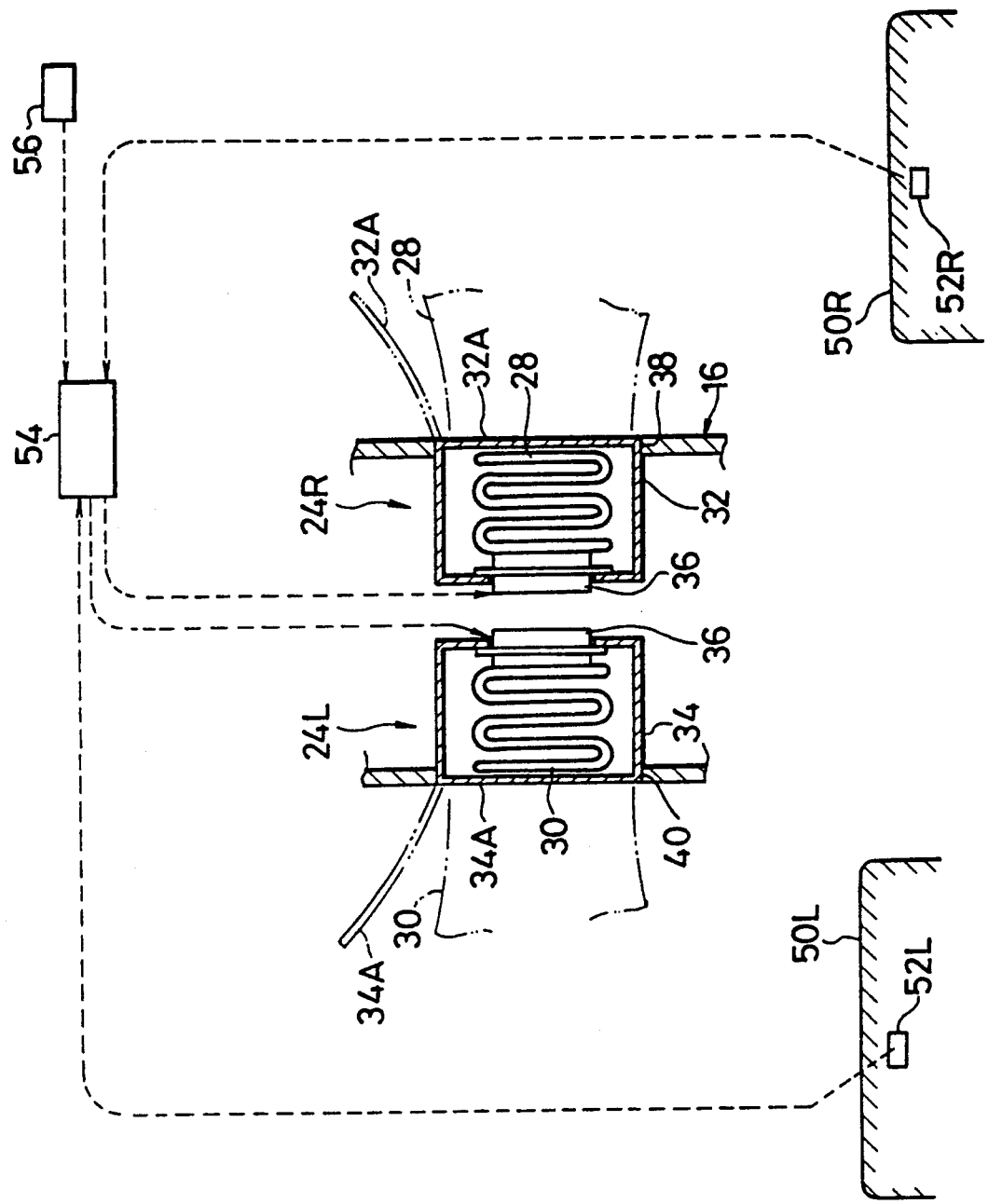
FIG. 5 is a block diagram showing an air bag device according to another embodiment.

FIG. 5 is a block diagram showing an air bag device according to another embodiment of the present invention.

In the present embodiment, the console box 16 is equipped with an air bag device 24R for the righthand seat 50R and an air bag device 24L for the lefthand seat 50L. The righthand and lefthand seats 50R and 50L are respectively equipped with seating sensors 52R and 52L, the detected signals of which are inputted to a controller 54. To the controller 54, there is also inputted a detected signal of an acceleration sensor 56 for detecting a collision of a vehicle. The remaining construction of FIG. 5 is similar to that of FIG. 3, and the identical portions are designated at the common reference numerals.

If a collision of the vehicle is detected by the acceleration sensor 56, the air bag device 24R or 24L at the side having the occupant seated is operated. If both the seats 50R and 50L have the occupants seated thereon, both the air bag devices 24R and 24L are operated.

As a result, if the vehicle having an occupant seated on one seat collides, the air bag device at the one side is exclusively operated. Thus, the single air bag device may be replaced when the vehicle damaged by the collision is to be repaired.

According to the present invention, as described above, the single air bag device can protect both the occupants seated on the driver's seat and the passenger's seat. As a result, the number of the air bag devices can be reduced to drop the cost for the device construction. Moreover, the single air bag device can be mounted with less troubles.

Since the air bag device is mounted in the console box in accordance with the present invention, it can allow a wide space around the knees of an occupant and accordingly an excellent comfortableness of the vehicle cabin.

According to the present invention, moreover, the two air bags are extended by the single inflater so that the cost for the parts can be dropped. And, the air bag device per se can be easily assembled.

According to the present invention, still moreover, only the air bag at the side having the occupant seated thereon is operated. As a result, if the vehicle is encountered by a collision or the like with only one seat being occupied by the occupant, only the air bag at the seated side is operated. Thus, only the air bag device at the seated side may be replaced when the vehicle is to be repaired.

What is claimed is:

1. An air bag device for a knee of an occupant, comprising:
   a console box of a vehicle arranged at a widthwise center portion of the vehicle,
   a retainer arranged at a center of the console box,
   a first air bag provided within said console box at a side of a righthand seat and being inflatable into a first zone in front of said righthand seat;
   a second air bag provided within said console box at a side of a lefthand seat and being inflatable into a second zone in front of said lefthand seat;
   one gas generator mounted on said retainer for injecting gases into both said first and second air bags;
   a first module cover attached to said retainer and covering said first air bag; and
   a second module cover attached to said retainer and covering said second air bag,
   wherein said first module cover faces a first opening which is formed in a righthand side of the console box, and said second module cover faces a second opening which is formed in a lefthand side of the console box.

2. An air bag device for a knee of an occupant, comprising:
   a console box of a vehicle arranged at a widthwise center portion of the vehicle,
   a retainer arranged at a center of the console box,
   a first air bag provided within said console box at a side of a righthand seat and being inflatable into a first zone in front of said righthand seat,
   a second air bag provided within said console box at a side of a lefthand seat and being inflatable into a second zone in front of said lefthand seat,
   a first gas generator mounted on said retainer for injecting gases into said first air bag,
   a second gas generator mounted on said retainer for injecting into said second air bag,
   a first module cover attached to said retainer and covering said first air bag, and
   a second module cover attached to said retainer and covering said second air bag,
   wherein said first module cover faces a first opening which is formed in a righthand side of the console box, and said second module cover faces a second opening which is formed in a lefthand side of the console box.

3. An air bag device according to claim 2, further comprising:
   a first seat sensor provided in said righthand seat for allowing inflation of said first air bag only when said righthand seat is occupied; and
   a second seat sensor provided in said lefthand seat for allowing inflation of said second air bag only when said lefthand seat is occupied, thereby eliminating unnecessary air bag inflation.

* * * * *